W. R. PARKER.
Corn Sheller.
No. 1,227. Patented July 9, 1839.
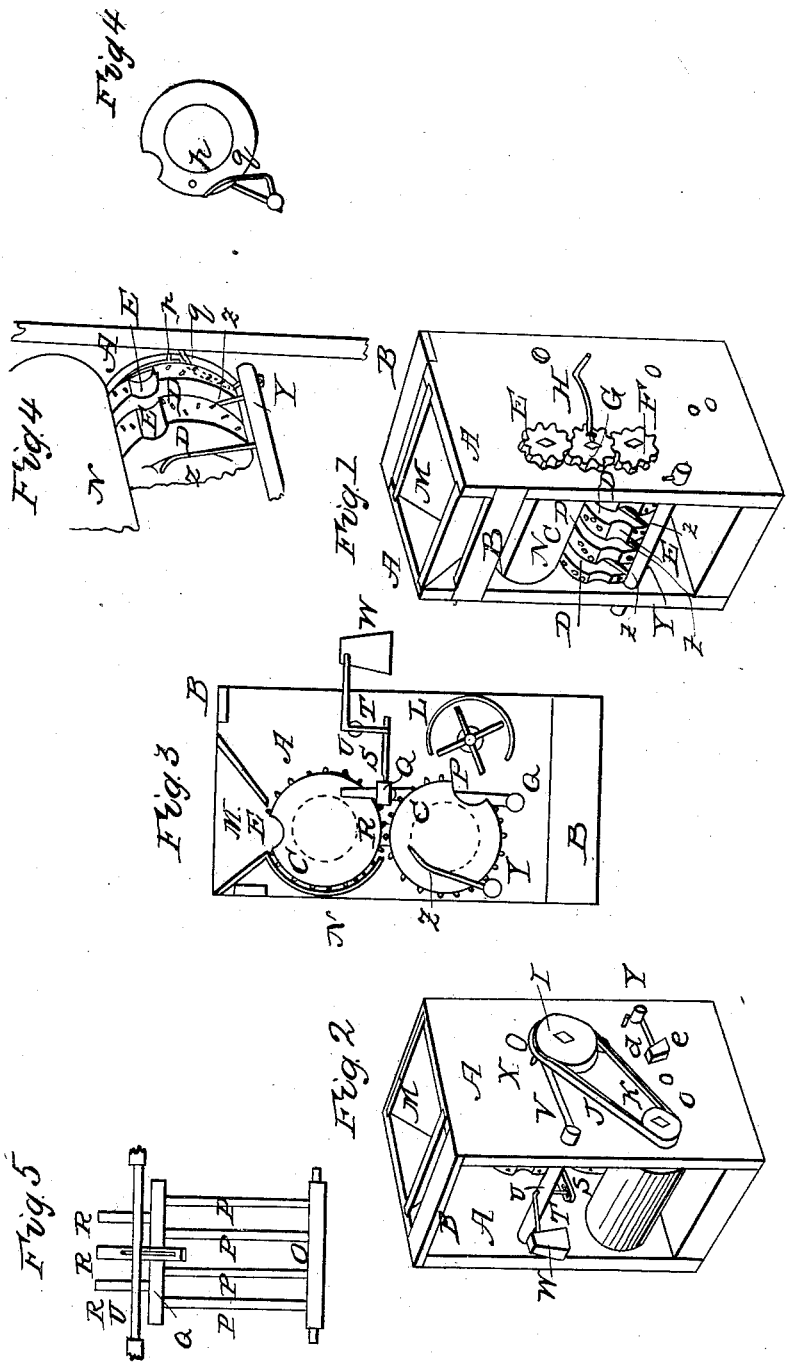

UNITED STATES PATENT OFFICE.

WM. R. PARKER, OF MILTON, DELAWARE.

MACHINE FOR SHELLING CORN.

Specification of Letters Patent No. 1,227, dated July 9, 1839.

*To all whom it may concern:*

Be it known that I, WILLIAM R. PARKER, of Milton, in the county of Sussex and State of Delaware, have invented a new and useful Machine for Shelling Corn, which is described as follows, reference being had to the annexed drawings of the same, making part of this specification.

Figure 1 is a perspective view of the right side and front of the machine; Fig. 2, is a perspective view of the left side and back; Fig. 3, is a vertical section through the center of the machine; Fig. 4, section showing curved arm $q$ and pin $p$; Fig. 5, section showing front view of shaft or arms P and fingers R.

Similar letters of reference in the several figures refer to similar parts.

This machine consists of two perpendicular boards A, A, Figs. 1, 2, 3, connected together by a suitable number of cross pieces B, B, arranged parallel to each other, forming a frame. Within said frame are placed two revolving cylinders C, C, Figs. 1, 3, the one over the other, about one inch apart, each armed with points over its surface, except where it is channeled or grooved in parallel channels D, Fig. 1, around its periphery, to admit certain fingers, hereafter described, and where it is hollowed or depressed lengthwise of the cylinder into cavities or depressions E, Figs. 1 and 3, to receive the ears of corn. The axles of said cylinders project beyond the sides of the machine to receive two cog-wheels E, Fig. 1—one on each axle, between which is placed another cog-wheel G, engaging with them, in order to cause the cylinders to turn in contrary directions.

The axle of the center cog wheel extends from one side of the machine to the other, having on one end a crank H by which the cylinders are turned, and on the other a pulley I, Fig. 2, around which passes a band J leading to a pulley K, on the end of the axle of a fan L, Fig. 3, placed at the rear of the lower cylinder for blowing away chaff and dirt from the grain. A hopper M is placed above the upper cylinder. In front of the upper cylinder and nearly encircling one half of it, is arranged a concave N, for keeping the ear of corn against the cylinder as it revolves and the ear descends.

Between the lower cylinder and the fan and below the center is arranged a vibrating axle O, Figs. 1, 2, 3, 5, from which rise vertically parallel arms P, Figs. 3 and 5, inserted therein connected together at their upper ends by a horizontal cross arm Q Figs. 3, 5, from which cross arm Q extend upward three or more fingers R, Figs. 3 and 5, which fingers and arms pass into the channels D of the cylinders C. These arms and fingers are to receive a vibrating movement by means of a horizontal bar S Figs. 2 and 3 extending back from the horizontal cross arm Q to the end of which bar S is attached a rod T passing vertically through a horizontal transverse vibrating shaft U. It then turns in a horizontal direction and has a weight W suspended to its outward end for pressing the fingers against the cylinder. This horizontal transverse shaft U, Figs. 2 and 3, is vibrated by means of an arm V inserted at right angles into said shaft U on the outside of the machine which is depressed by a pin X Fig. 2 projecting from the side of the pulley I on the crank axle.

The parallel fingers just described are for the purpose of holding the ear of corn between the two cylinders until it be shelled and then delivering the cob into the transverse groove E of the lower cylinder.

In front of the lower cylinder is placed another vibrating shaft Y, Figs. 1, 2, 3, containing a row of parallel fingers Z, which fall into the channels D of the lower cylinder. These fingers are for throwing the cob off from the cylinders, which is effected by moving the vibrating shaft Y, and this is done by means of a pin $p$, Fig. 4, inserted in the end of the lower cylinder pushing back a curved arm inserted into said vibrating shaft Y which thus turns it. The shaft is returned to its former position by means of another arm $d$, Fig. 2, inserted into it, to which is suspended a weight $e$.

In shelling corn with this machine an ear is placed in the hopper lengthwise of the cylinder. It descends and falls into the cavity in the surface of the upper cylinder, and the crank being turned, is carried around in the concave until it comes in contact with the fingers. At the same time the pin in the side of the pulley I, Fig. 2, strikes the arm V of the vibrating shaft U, depresses it and turns said shaft. This causes the fingers R to recede a short distance and to suffer the ear to fall by its gravity from the cavity in the upper cylinder against the fingers between which and the lower cylinder C it is held while the teeth in the cylinders strip off the grains of corn from the cob. The cob then falls into the cavity E in the lower cylinder and is carried around to the front of the machine where it is thrown off, or discharged by the other set of fingers moved by the pin $p$ Fig. 4 in the end of the cylinder striking the curved arm $q$ of the vibrating shaft Y containing the fingers Z which throw up the arm and turns the shaft with said fingers. The shaft and fingers are returned to their former position by the other arm $d$ and weight $e$. The corn falls between the lower cylinder, and fan, where the grain and chaff are separated by the blast from the fan. Every ear of corn is to be treated in a similar manner.

The size and proportions of the machine and the material of which it is composed may be such as to suit the wishes of the constructor.

The invention claimed and desired to be secured by Letters Patent consists in—

Constructing the cylinders C, C, with the longitudinal grooves or channels E on their surface and with parallel grooves or channels D around their periphery, in combination with the hopper M and concave N the whole being constructed and operating in the manner and for the purposes herein described.

WILLIAM R. PARKER.

Witnesses:
JNO. PONDER,
ROBERT F. GRAY.